(12) United States Patent
Burger

(10) Patent No.: US 8,836,155 B2
(45) Date of Patent: Sep. 16, 2014

(54) HYDRODYNAMIC ARRAY WITH MASS TRANSIT TUNNELS

(75) Inventor: Martin Burger, Columbia Valley (CA)

(73) Assignee: Blue Energy Canada Inc., Vancouver (CA)

(*) Notice: Subject to any disclaimer, the term of this patent is extended or adjusted under 35 U.S.C. 154(b) by 208 days.

(21) Appl. No.: 13/282,337

(22) Filed: Oct. 26, 2011

(65) Prior Publication Data

US 2012/0153625 A1    Jun. 21, 2012

Related U.S. Application Data

(60) Provisional application No. 61/406,923, filed on Oct. 26, 2010.

(51) Int. Cl.
| | |
|---|---|
| F03B 13/10 | (2006.01) |
| F03B 13/12 | (2006.01) |
| H02P 9/04 | (2006.01) |
| F03B 13/26 | (2006.01) |
| F03B 17/06 | (2006.01) |

(52) U.S. Cl.
CPC ............. *F03B 13/264* (2013.01); *Y02E 10/28* (2013.01); *F03B 13/268* (2013.01); *F03B 17/063* (2013.01)
USPC ........................................................ 290/53

(58) Field of Classification Search
CPC .... F03B 13/264; F03B 17/063; F03B 13/268; F03B 13/26; Y02E 10/28; Y02E 10/20
USPC .......................................... 290/53, 54, 42, 43
See application file for complete search history.

(56) References Cited

U.S. PATENT DOCUMENTS

| | | | | |
|---|---|---|---|---|
| 8,400,006 | B2* | 3/2013 | Burger et al. | 290/54 |
| 2011/0236135 | A1* | 9/2011 | Roberts | 405/77 |
| 2012/0186676 | A1* | 7/2012 | Burger | 137/613 |

FOREIGN PATENT DOCUMENTS

| | | |
|---|---|---|
| FR | 2 865 226 A1 | 7/2005 |
| GB | 2 298 004 A | 8/1996 |
| WO | 03/025385 A2 | 3/2003 |
| WO | 2005/017349 A1 | 2/2005 |
| WO | 2006/108264 A1 | 10/2006 |
| WO | 2008/063008 A1 | 5/2008 |
| WO | 2010/032026 A2 | 3/2010 |
| WO | 2011/005100 A1 | 1/2011 |
| WO | 2011/025387 A1 | 3/2011 |

OTHER PUBLICATIONS

International Search Report mailed Jan. 11, 2012, issued in corresponding PCT/CA2011/050670, filed Oct. 26, 2011, 3 pages.
International Search Report mailed Sep. 1, 2010, issued in PCT/CA2010/000813, filed Jun. 2, 2010, 3 pages.
Davis, B.V., "A Major Source of Energy From the Worlds Oceans," Intersociety Energy Conversion Engineering Conference (IECEC-97), Honolulu, Jul. 27-Aug. 1, 1997, pp. 1-8.

* cited by examiner

*Primary Examiner* — Javaid Nasri
(74) *Attorney, Agent, or Firm* — Christensen O'Connor Johnson Kindness PLLC

(57) ABSTRACT

A hydrodynamic array comprises multiple hydrodynamic elements, including a tidal modulator, for producing electricity by the motion of ocean tides or river currents and forces acting on the hydrodynamic array, which is immersed in ocean tides or river currents and which is in motion relative to the ocean tides or river currents. A viaduct with mass transit tunnels sits atop the hydrodynamic array.

9 Claims, 5 Drawing Sheets

HYDRODYNAMIC ARRAY WITH MASS TRANSIT TUNNELS

CROSS-REFERENCE TO RELATED APPLICATION

This application claims the benefit of Provisional Application No. 61/406,923, filed Oct. 26, 2010, which is incorporated herein by reference.

BACKGROUND

Mass transit is a shared passenger transportation service which is available for use by the general public. Mass transit includes buses, trolleys, trains, and ferries. Modern public transport between cities is being developed, such as high-speed rail networks. The advent of renewable energy, such as tidal energy, requires large infrastructure to harvest power from the ocean or river. Such a large infrastructure can be envisioned to support mass transit.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the present subject matter includes a system for producing electricity hydrodynamically. The system comprises a viaduct including mass transit tunnels. The system further comprises a hydrodynamic array including a tidal modulator, which is configured to support the viaduct and further configured to generate electricity from the motion of ocean tides or river currents and forces acting on the hydrodynamic array. The tidal modulator is configured to modulate the ocean tides or river currents.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Various embodiments of the present subject matter are directed to a hydrodynamic array configured to produce electricity not only from ocean tides but also river currents. Suitably situated on top of the hydrodynamic array is a viaduct configured both for automobile transportation and also the construction, assembly, disassembly, installation, removal, and maintenance of pieces of the hydrodynamic array including its structural, mechanical, electrical, and electronic support equipment. Situated below the viaduct but on top or along side of the hydrodynamic array are one or more mass transit tunnels. Each element of the hydrodynamic array can be interconnected with another element and so on to form a porous hydrodynamic array going across a strait, passage, estuary, canal, flume, or river.

Figure 1:
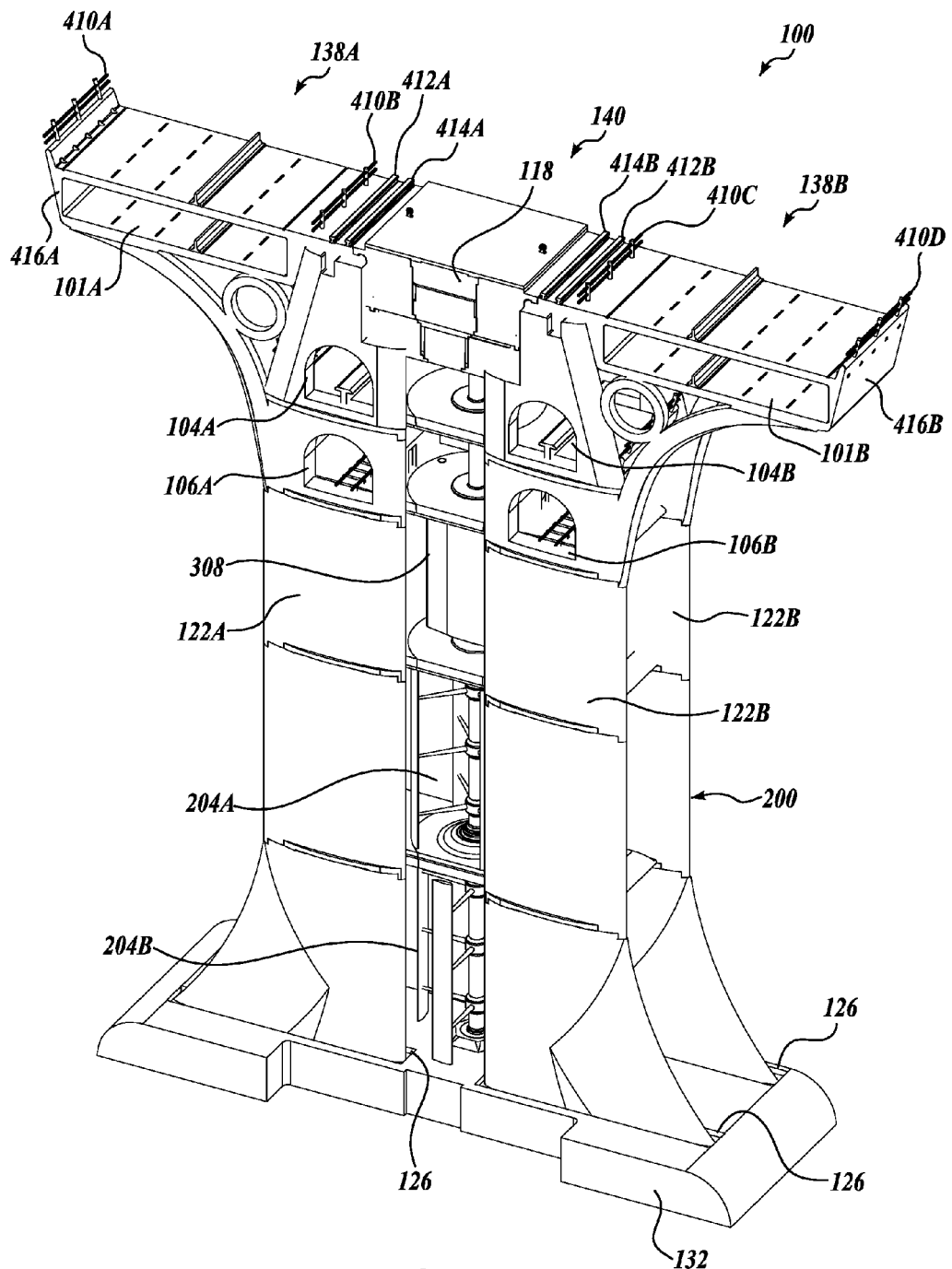
FIG. 1 is a cross-sectional, assembled, isometric view of portion of an archetypical viaduct on top of an archetypical portion of a hydrodynamic array.
Figure 2:
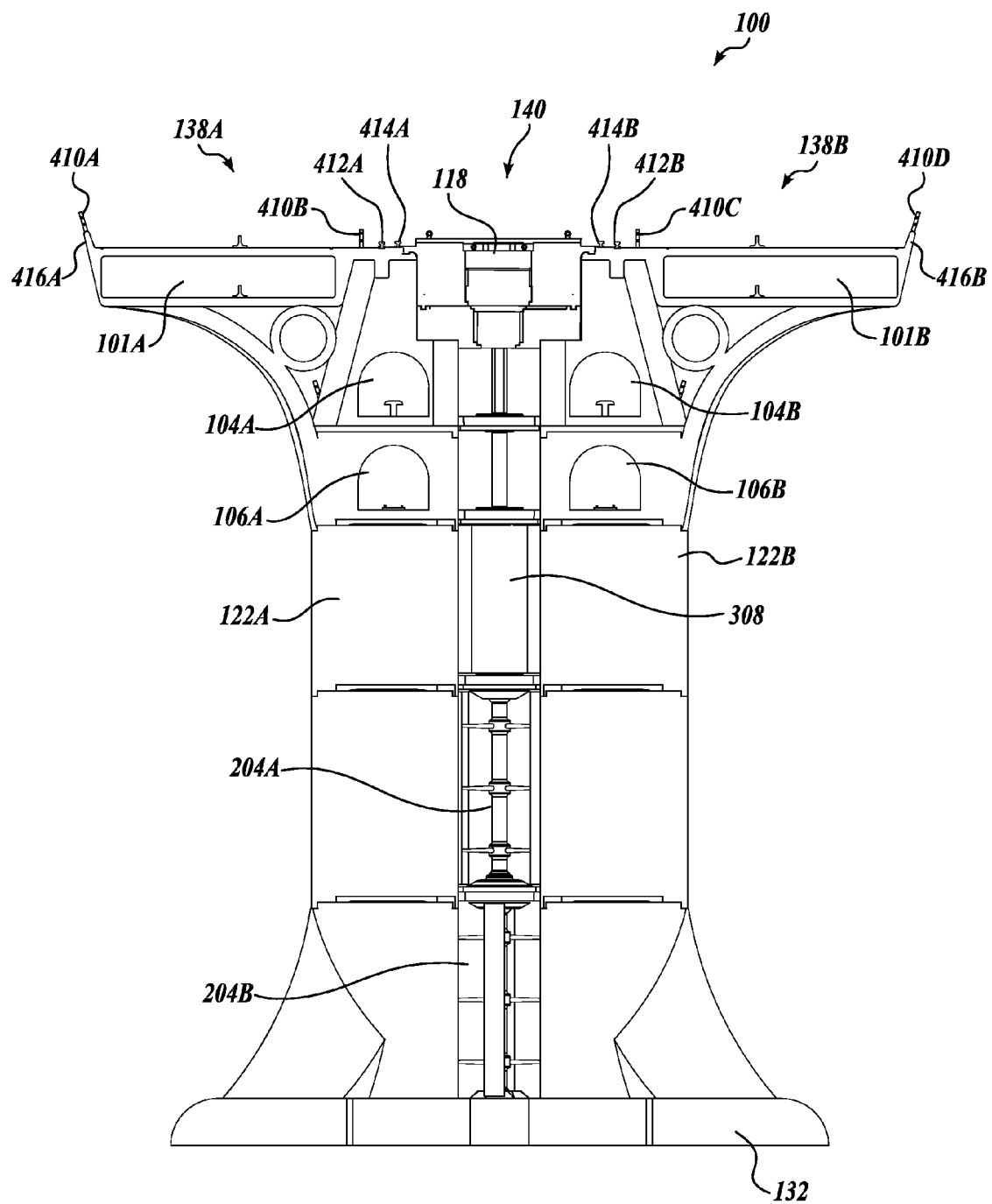
FIG. 2 is a front view of portion of an archetypical viaduct on top of an archetypical portion of a hydrodynamic array.
Figure 3:
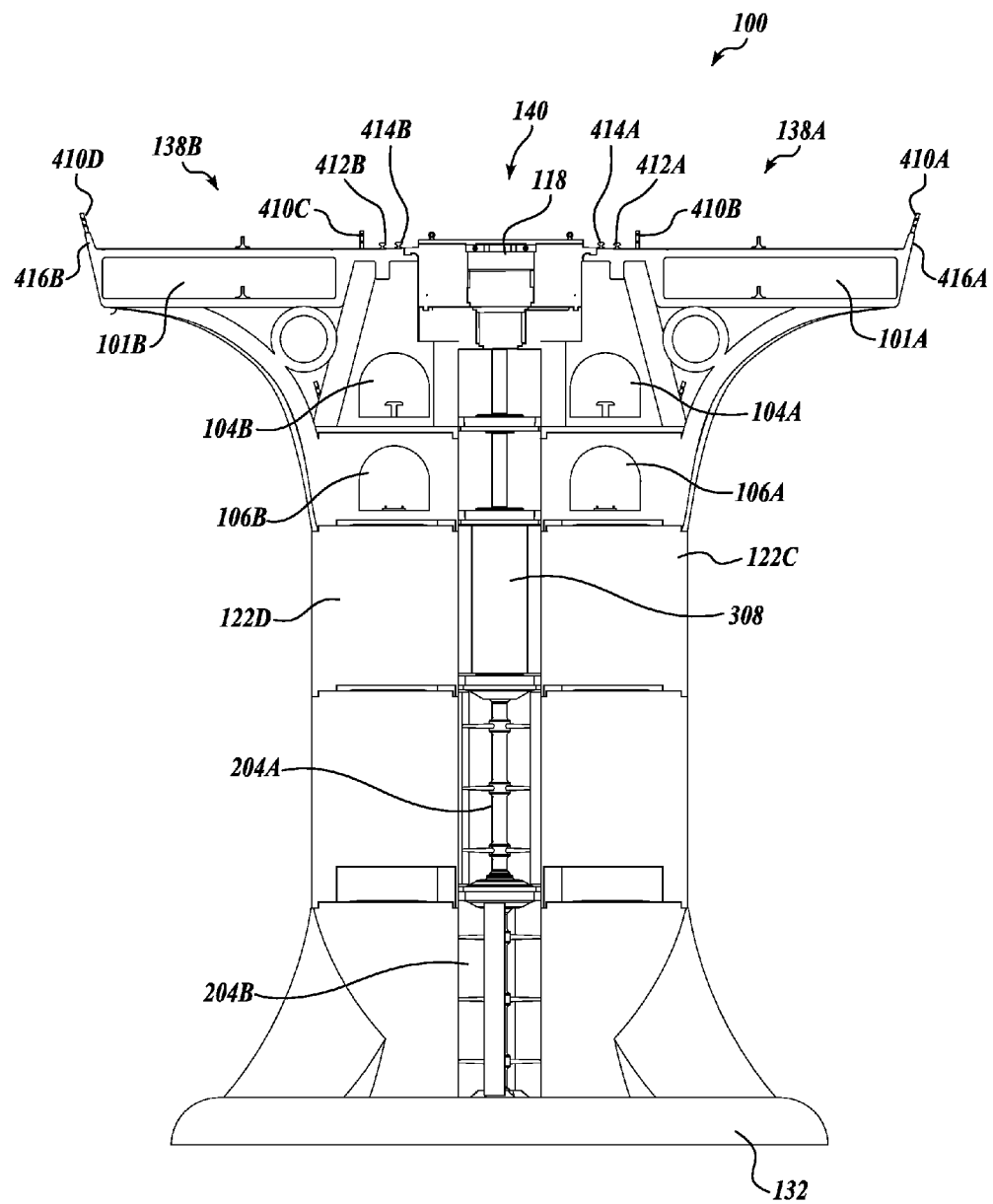
FIG. 3 is a back view of a portion of an archetypical viaduct on top of an archetypical portion of a hydrodynamic array.
Figure 4:
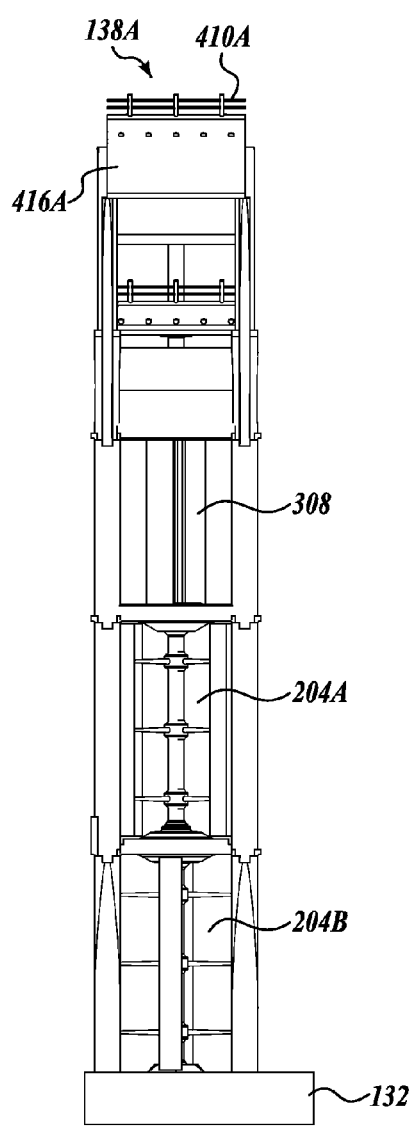
FIG. 4 is a side view of a portion of an archetypical viaduct on top of an archetypical portion of a hydrodynamic array.
Figure 5:
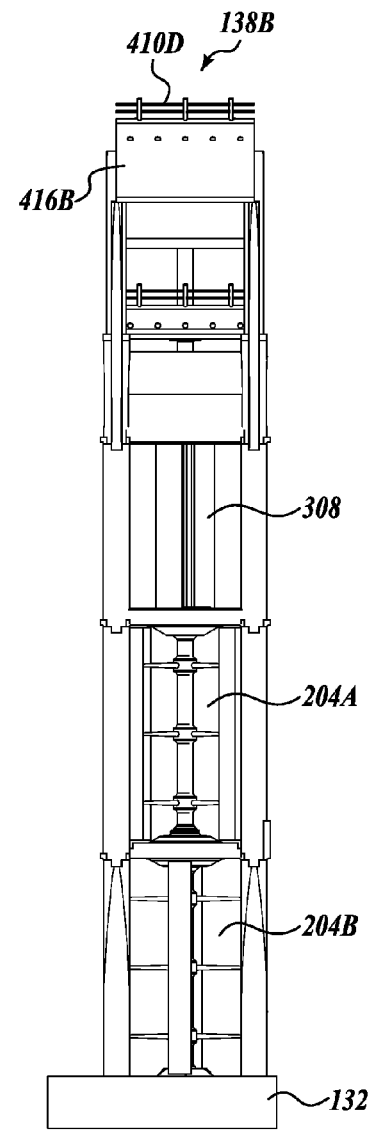
FIG. 5 is another side view of a portion of an archetypical viaduct on top of an archetypical portion of a hydrodynamic array.
Figure 6:
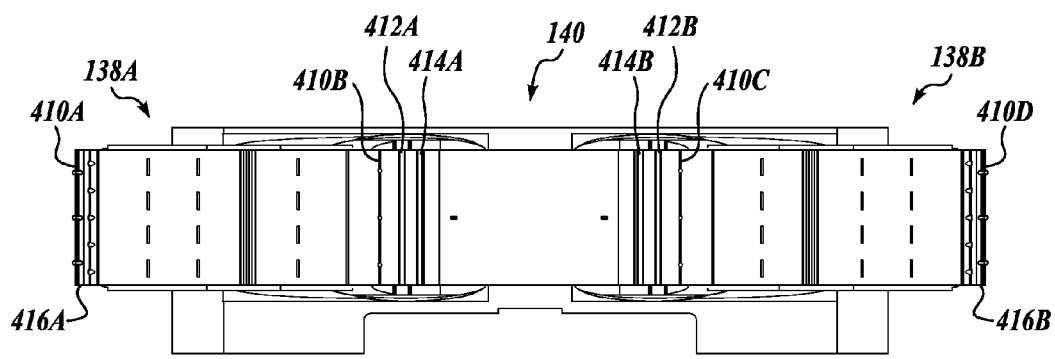
FIG. 6 is a plan view of the top of a portion of an archetypical viaduct.
Figure 7:
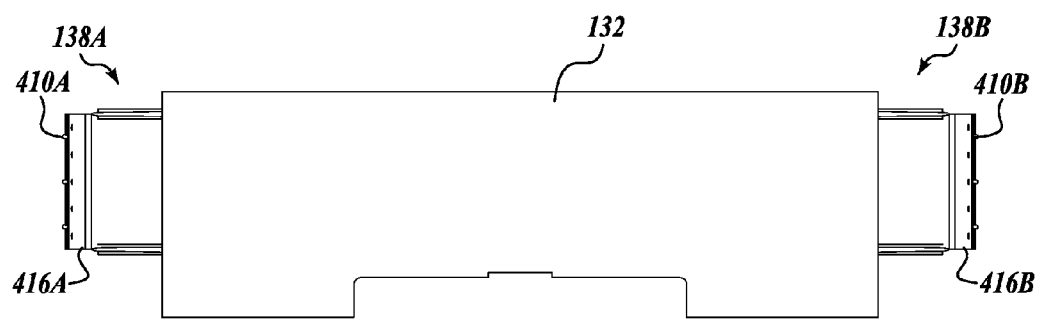
FIG. 7 is a plan view of the bottom of a portion of an archetypical hydrodynamic array.

FIG. 1 illustrates a portion of a viaduct 100, which comprises short elevated roadway spans 138a, 138b separated by a median strip 140. The viaduct 100 consists of a series of short roadway spans interconnected with median spans, and supported by columns of a hydrodynamic array 200. More specifically, the viaduct 100 is an array of viaduct elements. Each viaduct element is a set of members including two corresponding roadway spans 138a, 138b; two corresponding subjacent roadway tunnels 101a, 101b; two corresponding subjacent rail tunnels 104a, 104b; and two corresponding subjacent track tunnels 106a, 106b. Each corresponding roadway span 138a, 138b is interconnected with a median span (such as a median span 140). Each viaduct element is interconnected with other viaduct elements via latches or other fastening structures to form a viaduct 100. Because the viaduct 100 is formed from multiple sets of roadway spans, one skilled in the art would appreciate that the discussion is pertinent to other sets of roadway spans forming the viaduct 100. For example, a three-lane roadway is adjacent to a two-lane roadway, but that needs not be so, and other suitable roadway configurations can be used. Similarly, the roadway tunnels 101a, 101b illustrate a three-lane roadway being adjacent to a two-lane roadway, but other configurations are suitable.

The hydrodynamic array 200 is an array of hydrodynamic elements. Each hydrodynamic element is a set of members and includes four columns (such as columns 122a, 122b, 122c, and 122d) supporting a viaduct element. The four columns 122a, 122b, 122c, and 122d rest on four grooves 126, which are bored into the top of a base plate block 132. Besides the four columns 122a, 122b, 122c, and 122d, and the base plate block 132, the hydrodynamic element also includes a nested machinery chamber 118; rotor assemblies 204a, 204b; and a tidal modulator 308. In one embodiment, the hydrodynamic element includes mechanical, electrical, and electronic members to form a vertical axis hydraulic turbine for producing energy from ocean tides or river currents. Each hydrodynamic element is interconnected with other hydrodynamic element via latches or other structural fasteners to form the hydrodynamic array 200.

Roadway spans 138a, 138b include guardrails 410a, 410b, 410c, 410d for warding automobiles and people away from danger as they traverse the viaduct 100. In one embodiment, each guardrail 410a, 410b, 410c, 410d is a barrier made of suitable material, such as steel cables, placed along the edges of the roadway spans 138a, 138b, and the edges of the median span 140. Each roadway span 138a, 138b includes a concrete separator that separates a set of roadway lanes from another set of roadway lanes. Each roadway span 101a, 101b houses a platform on which guardrails 410a, 410b, 410c, 410d are mounted next to crane rails 412a, 412b, which are manufactured of raw steel, forming a track for a wheeled vehicle that carries a crane for raising, shifting, or lowering members of the hydrodynamic element by means of a hoisting apparatus supported by the crane rails 412a, 412b. Adjacent to the crane rails 412a, 412b are equipment rails 414a, 414b for forming tracks for wheeled vehicles to carry various machinery. The median span 140 is the top of the nested machinery chamber 118.

Each column, such as columns 122a, 122b, 122c, and 122d, is formed from one or more column members, each of which has a longitudinal mortise at a top. The longitudinal mortise terminates at either end of the column member. The bottom of each column member is finished into a longitudinal tenon. Each longitudinal tenon of one column member is interconnected with another longitudinal mortise of another column member of the same column so as to link the members of the column together to obtain desired height.

In one embodiment, an arrangement of a quartet of columns 122a, 122b, 122c, and 122d, each thickly made from reinforced marine concrete having an elliptical or other suitable cross-sectional shape. In one embodiment, the quartet of columns 122a, 122b, 122c, and 122d guides the tidal flow through the tidal modulator 308 comprising one or more butterfly valves, and a center valve, so that tidal flow can be regulated. To facilitate this effect in which the flow of fluid may be started, stopped, or regulated by movable and/or stationary valves that open, shut, or partially obstruct fluid passageways created by the quartet of columns 122a, 122b, 122c, and 122d, the relationship of the butterfly valves, one to the other, is controlled. Each butterfly valve is actuated to achieve desired tidal flow within the rotor bays of the tidal bridge so as to allow the tidal bridge to harvest tidal power in greater range, and to allow for volumetric egress of water from storm surge or flooding conditions, which reduces flow velocities through the tidal bridge.

In another embodiment, an arrangement of a quartet of columns 122a, 122b, 122c, and 122d, each thickly made from reinforced marine concrete having an elliptical or other suitable cross-sectional shape, are supported by the base plate block 132 mounted on the seafloor. Such an arrangement forms a foundation for stabilizing the other members of the hydrodynamic element. In one embodiment, the quartet of columns 122a, 122b, 122c, and 122d guides the water flow through a vertical axis hydrofoil turbine so that additional power is obtained from the varying directions of the water flow across the turbine hydrofoils, and from one turbine duct to another. To facilitate this effect, the relationship of the turbine blades, one to the other, is synchronized. Each turbine turns in the opposite rotation direction to its neighboring turbine, the latter of which is supported by another quartet of columns. This arrangement of columns eliminates or reduces interference effects between the turbine blades and the duct walls, which can cause torque fluctuations and possible fatigue of either the duct walls or the turbine blades, with eventual consequent loss of power or structural failure.

As would be appreciated by one skilled in the art, the viaduct 100 can be extended across a waterway to connect land bounds, facilitating automobiles carrying passengers and vehicles carrying members of hydrodynamic elements to navigate across the waterway, either via the exposed roadway spans 138a, 138b, or underneath in the roadway tunnels 101a, 101b; rail tunnels 104a, 104b; or track tunnels 106a, 106b. As discussed previously, the viaduct 100 comprises multiple roadway spans (such as roadway spans 138a, 138b) and other viaduct elements that are interconnected with multiple median spans (such as median span 104) and structural fasteners, such as latches. Beneath the viaduct 100 is the hydrodynamic array 200, of which the hydrodynamic elements are arranged among quartets of columns (such as columns 122a, 122b, 122c, and 122d) supporting a pair of roadway spans and a single median span and other viaduct elements. Each hydrodynamic element of the hydrodynamic array 200 comprises one or more rotor assemblies supported by the quartet of columns that sits upon a base plate block 132 configured to receive the motion of ocean tides or river currents acting against each hydrodynamic element to generate electricity. The quartet of columns serves as structural support for the top, center, and bottom platforms that also house bearing assemblies, and in some embodiments, enhance the hydrofoil aspect ratio. As discussed before, the quartet of columns supports the nested machinery chamber 118, which houses the journal and thrust bearings configured to mechanically couple to the rotor assemblies.

The viaduct 100 is supported by columns, such as columns 122a, 122b, 122c, and 122d that are members of a hydrodynamic element, one of many hydrodynamic elements comprising the hydrodynamic array 200. As discussed previously, the viaduct 100 comprises roadway spans, such as roadway spans 138a, 138b. Each roadway span 138a, 138b is in parallel to each other and comprises safety walls 416a, 416b on which guardrails 410a, 410b, 410c, 410d are mounted and beneath which form safety walls 416a, 416b for roadway tunnels 101a, 101b. Each roadway span 138a, 138b houses platforms on which the guardrails 410a, 410b, 410c, 410d are mounted, the crane rails 412a, 412b are installed, and the equipment rails 414a, 414b are situated to form a track for wheeled vehicles to carry equipment to various locations along the median strip 140. Projecting basipetally from the nested machinery chamber 118 is a torque drive shaft that is coupled to the tidal modulator 308 and rotor assemblies 204a, 204b.

As will be appreciated by one skilled in the art, two members of the quartet of columns are in parallel to the other two remaining members of the quartet of columns. For example, columns 122a, 122b are in parallel position with respect to columns 122c, 122d. Suitably, other rotor assemblies adjacent to the rotor assembly 204a turn in an opposing direction from the direction of the rotor assembly 204b. The lower rotor assembly 204b is 45 degrees out of phase with the adjacent rotor assemblies to illustrate the opposing direction that the lower rotor assembly 204b turns with respect to its adjacent neighboring rotor assemblies.

While illustrative embodiments have been illustrated and described, it will be appreciated that various changes can be made therein without departing from the spirit and scope of the invention.

The invention claimed is:

1. A system for producing electricity hydrodynamically, comprising:
   a viaduct including mass transit tunnels; and
   a hydrodynamic array including a tidal modulator, which is configured to support the viaduct and further configured to generate electricity via hydrodynamic elements forming a vertical axis hydraulic turbine from the motion of ocean tides or river currents and forces acting on the hydrodynamic array, the tidal modulator being configured to modulate the ocean tides or river currents.

2. The system of claim 1, wherein the viaduct is formed from multiple pairs of roadway spans, each roadway span including guardrails, safety wall, crane rails, equipment rails.

3. The system of claim 1, wherein the hydrodynamic array is formed from multiple hydrodynamic elements, a first hydrodynamic element including a first quartet of columns, which supports a first pair of roadway spans latitudinally.

4. The system of claim 3, wherein two columns of the first quartet of columns together with two additional columns form a second quartet of columns, which supports a second pair of roadway spans latitudinally.

5. The system of claim 4, wherein the hydrodynamic element includes a nested machinery chamber, the top of the nested machinery chamber defining a median span.

6. The system of claim 3, further comprising base plate block has four grooves to accommodate feet of the first quartet of columns.

7. The system of claim 1, wherein the mass transit tunnels include roadway tunnels.

8. The system of claim 1, wherein the mass transit tunnels include rail tunnels.

9. The system of claim 1, wherein the mass transit tunnels include track tunnels.

\* \* \* \* \*